Dec. 9, 1941.   E. H. NICHOLS   2,265,540
GRANULAR MATERIAL
Filed Oct. 4, 1938
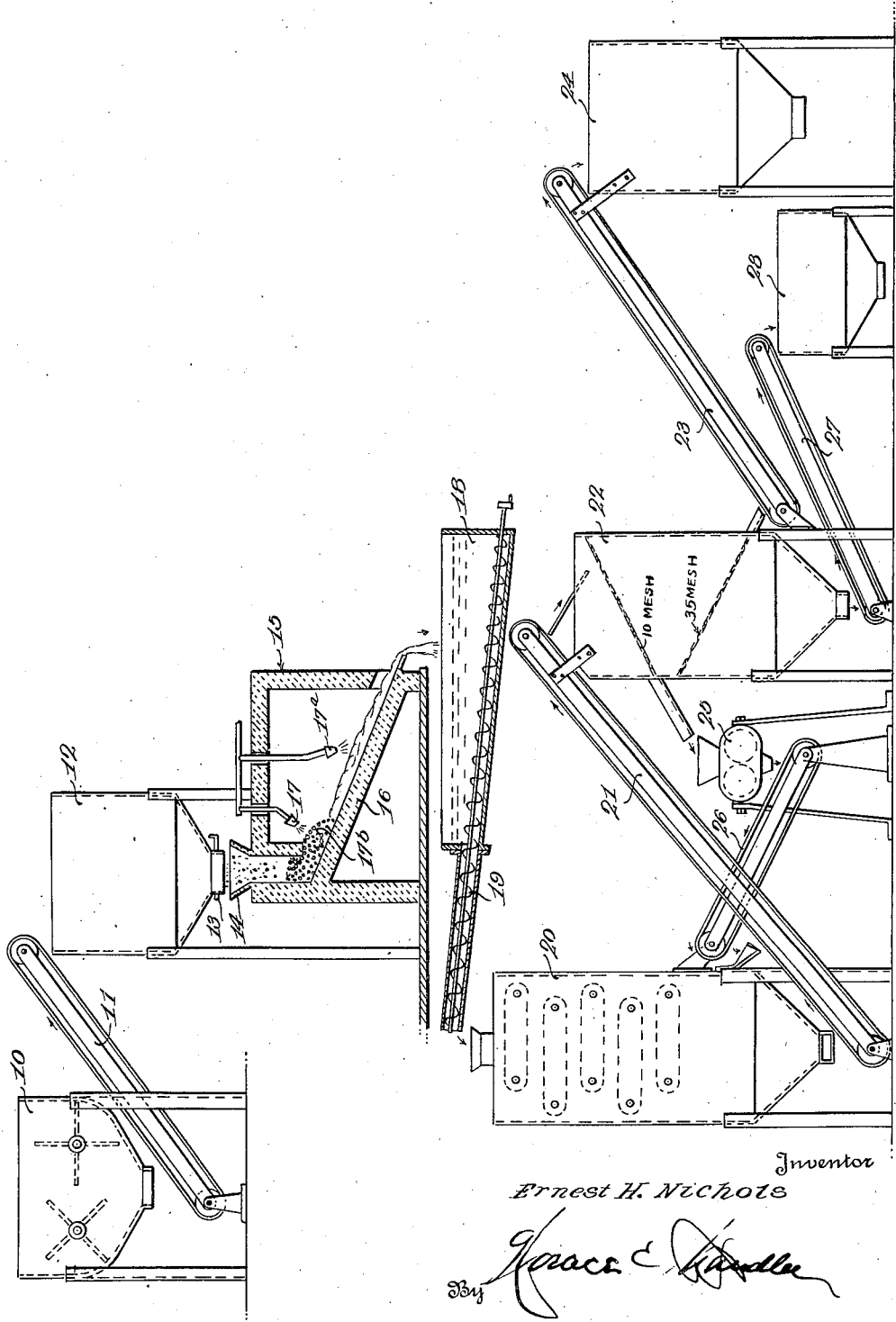
Inventor
Ernest H. Nichols
By Horace E. Chandler
Attorney Patented Dec. 9, 1941

2,265,540

UNITED STATES PATENT OFFICE 2,265,540

GRANULAR MATERIAL

Ernest H. Nichols, Hagerstown, Md., assignor to The Funkhouser Company, Hagerstown, Md., a corporation of Maryland Application October 4, 1938, Serial No. 234,570

6 Claims. (Cl. 106—52)

This invention relates to new and useful improvements in granular material such as is principally used as a surfacing for asphalt coated roofing, whether in shingle, roll, or other form, for imparting the desired color thereto and for protective purposes. In the manufacture of such roofing it is customary to use granules of a particular color, in order to harmonize with a given color scheme.

These granules, which have come to be known as "roofing granules," have been made largely by crushing mineral matter in its natural state or otherwise, by then screening the crushed material to recover the desired size or sizes, and by then coloring the recovered material by any of a number of methods, including that of fusing a vitreous coating to the granules, said coating having the desired coloring agent embedded therein.

The manufacture of such granules is not only costly, but there is a great tendency for the coating, which is highly frangible, to chip off while the granules are being handled in bulk, thus exposing areas not having the desired color and at the same time producing sharp abrasive edges on the granules, which are injurious to the hands and clothing of persons handling the roofing. The chipping off of this coating is particularly objectionable when the coated base material is of an absorbent nature as areas are then exposed which will permit the said base material to absorb water and thus produce the highly objectionable condition known as "blistering." Again, these exposed areas permit the absorbent base to become stained or discolored by the absorption of the asphalt to which the granules adhere when applied to the roofing, also by the absorption of atmospheric contaminations such as dirt, soot, etc., thus producing spots of a color different from that of the vitreous coating.

In order for roofing granules to be acceptable they must not only be free from the foregoing characteristics but they must have color permanency, must be hard but not brittle, to prevent accidental fracture, and must be weather-resistant in every respect.

Roofing granules have also been colored by the application thereto of an unfused superficial coating, but such granules are frequently unsatisfactory in that they are subject to discoloration by absorption, as already described, cause "blistering," and are subject to fading.

With the foregoing in mind, it is one object of the present invention to provide vitreous granular material of the type mentioned which shall be black throughout, and which shall also be non-fading, weather-resistant, non-absorbent, insoluble, and opaque, and which shall also have such surface characteristics as to cause it to adhere properly to the asphalt coating of the roofing to which it is attached.

A further object is to provide a method for producing such black granular material, which method shall include the compounding and vitrifying of such mineral matter as will react, during the vitrifying process, to produce the black appearance throughout each granule, whereby to eliminate the necessity of adding a coloring agent to the compound.

In the drawing, the figure is a diagrammatic elevation (partly in section) of apparatus suitable for carrying out the various steps of the process employed in the production of roofing granules according to this invention.

I have found that schistose greenstone and quartzite, because of their chemical characteristics, are suitable, when properly combined, for use as raw materials in the production of roofing granules having the desirable characteristics heretofore mentioned.

The greenstone to which I refer is that described in the Geological Atlas of the United States, under the Fairfield-Gettysburg folio for Pennsylvania (folio 225), by George W. Stone and F. Bascom, published in the United States Geological Survey, in 1929 (see p. 5 of that folio). As there shown, the rock may be found at Gladhill, Pennsylvania (see the first map in said folio). The chemical analysis of a typical sample of the greenstone is as follows:

| | |
|---|---|
| Ignition loss | 1.76 |
| Water | .09 |
| Silica ($SiO_2$) | 46.10 |
| Alumina ($Al_2O_3$) | 16.35 |
| Iron oxide ($Fe_2O_3$) | 12.80 |
| Manganese oxide ($MnO_2$) | .33 |
| Titanium oxide ($TiO_2$) | 1.93 |
| Zirconium oxide ($ZrO_2$) | .24 |
| Calcium oxide (CaO) | 10.93 |
| Magnesium oxide (MgO) | 6.00 |
| Potassium oxide ($K_2O$) | 1.05 |
| Sodium oxide ($Na_2O$) | 2.23 |
| Phosphorous pentoxide ($P_2O_5$) | .09 |

The chemical analysis of a typical sample of the quartzite is as follows:

| | |
|---|---|
| Silica ($SiO_2$) | 91.50 |
| Alumina ($Al_2O_3$) | 4.07 |
| Iron oxide ($Fe_2O_3$) | 2.50 |
| Titanium oxide ($TiO_2$) | .56 |
| Manganese oxide ($MnO_2$) | .06 |
| Calcium oxide (CaO) | .47 |
| Potassium oxide ($K_2O$) | .21 |
| Sodium oxide ($Na_2O$) | Trace |
| Ignition loss | .68 |

I do not limit myself to the use of greenstone and quartzite, but may use other stone or mineral having the same or closely similar chemical characteristics.

When carrying out my invention with the use of the greenstone and quartzite, these raw materials are first separately crushed and screened to obtain such particles as will pass a screen of approximately 35 mesh. The resultant products, which will include particles ranging in size from those that just succeed in passing the 35 mesh screen down to impalpable powder, are then stored separately in suitable bins. I next place a batch of the screened material in a suitable mixer, as indicated at 10 in the drawing, in the following proportions: 75% of greenstone screenings and 25% of quartzite screenings. The chemical analysis of this batch will then be as follows:

| | |
|---|---|
| Ignition loss | 1.490 |
| Water ($H_2O$) | .068 |
| Silica ($SiO_2$) | 57.500 |
| Alumina ($Al_2O_3$) | 13.310 |
| Iron oxide ($Fe_2O_3$) | 10.230 |
| Manganese oxide ($MnO_2$) | .270 |
| Titanium oxide ($TiO_2$) | .180 |
| Calcium oxide (CaO) | 8.320 |
| Magnesium oxide (MgO) | 4.500 |
| Potassium oxide ($K_2O$) | .840 |
| Sodium oxide ($Na_2O$) | 1.680 |
| Phosphorous pentoxide ($P_2O_5$) | .070 |

This batch is then thoroughly mixed after which it is discharged onto an elevator 11 by means of which it is carried to and deposited in the storage bin 12 having a controlled chute 13 through which the mixed material is gradually fed into the hopper 14 of a furnace indicated at 15. Here the mixed material gravitates onto and accumulates at the higher end of an inclined hearth 16, which hearth receives the heat from burners 17 and 17a discharging downwardly thereupon.

It will be noted, by reference to the drawing, that the burner 17 is so positioned that it will play upon the accumulation of batch material indicated at 17b. The burner will be of such a character as will subject this accumulated material to a temperature of approximately 2500° F. The batch will then become fused to such a degree as will reduce it to a plastic mass rather than a fluid, care being exercised to avoid heating to such a degree as will reduce this material to the consistency of molten glass. The hearth 16 is inclined to such a degree as will cause the now plastic batch to move towards its lower end, during the course of which movement it passes beneath the burner 17a, which maintains the plastic condition. It will be noted that the burner 17a is inclined in the direction of the lower end of the hearth, as a result of which the flame issuing from that burner will aid in the movement of the plastic batch.

Having passed the lower or outer end of the hearth 16, the thus fired batch is discharged into a water bath contained in a quenching tank 18. This water treatment causes the batch to harden and break up into particles of various relatively small sizes.

Connected to the quenching tank 18 is a screw conveyor 19 by means of which the particles, to which the batch has now been reduced, are transferred to a suitable drier 20 from which they pass by means of an elevator 21 to a screening apparatus 22. Here the material is screened to recover the particles that will pass a 10 mesh screen and be retained on a 35 mesh screen, which particles are then carried by an elevator 23 to a storage bin 24. Any oversize material retained on the 10 mesh screen is passed, in any suitable manner, to a crusher indicated at 25, where it is reduced in size. This crushed material is then carried, by a belt or other conveyor 26, back to the elevator 21, where it is added to the material passing from the drier 20 and with which it is again delivered to the screens 22. This treatment of the oversize material is continuously carried on during the entire operation.

During the screening operation carried on by the screens 22, an amount of fine material too small for use as granules will pass through the 35 mesh screen. This material is carried by a suitable conveyor 27 to a storage bin 28. When a sufficient amount of this fine material has accumulated it is used as a portion of the original batch in the mixer 10, which includes the greenstone and quartzite screenings, by mixing in the following proportions: 20% of the fine material, 60% of the greenstone screenings; and 20% of the quartzite screenings. The chemical analysis of a batch prepared in the manner just described will then be the same as the batch described in the first instance and made up of the greenstone and quartzite only, since the ratio of the greenstone to the quartzite remains the same, 3 to 1, no matter how fine the fine material may be, it being remembered that this fine material is made by combining 75% of greenstone and 25% of quartzite.

It will be found that granular material produced according to the method and with the use of the material described, will appear black throughout, non-fading, weather-resistant, non-absorbent, insoluble, and opaque; and that it will have such surface characteristics as will enable it to adhere properly to the asphalt coating of the roofing.

What is claimed is:

1. In the manufacture of blackish glassy opaque relatively hard non-brittle roofing granules, the herein described process which comprises first producing a finely divided mixture of schistose greenstone and quartzite, heating said mixture to a temperature at which a plastic mass of sluggish flow is produced which step involves incipient fusion and reaction of said mass and chemical reaction between said components, quenching said so-heated material, crushing said quenched material, and separating granules of a size appropriate for roofing granules.

2. A process of making roofing granules which comprises heating a mixture of stony material consisting essentially of quartzite and stony material consisting essentially of schistose greenstone, up to incipient fusion of said mixture, rapidly cooling such heated material, crushing such material and separating granules of a size suitable for use as roofing granules.

3. A process of making roofing granules which comprises heating a mixture of stony material consisting essentially of quartzite and stony material consisting essentially of schistose greenstone, said heating resulting in incipient fusion of said mixture, rapidly cooling such heated material, crushing such material, separating granules of a size suitable for use as roofing granules, thereby leaving fines smaller than the desired granule size, and adding said fines to the mixture to be heated in a subsequent run of said process.

4. A process as in claim 2, in which at least one of the stony materials contains a substantial percentage of a fluxing agent.

5. A process as in claim 2, in which the schistose greenstone is about three times as much as the quartzite.

6. A process as in claim 3, in which about three parts of schistose greenstone, and about one part of quartzite are mixed with a small amount of the fines from the crushing operation.

ERNEST H. NICHOLS.